United States Patent [19]

Ganoung

[11] 4,280,469
[45] Jul. 28, 1981

[54] POWERTRAIN AND APPARATUS USING A CONTINUOUSLY VARIABLE RATIO TRANSMISSION TO IMPROVE FUEL ECONOMY

[76] Inventor: David P. Ganoung, 4406 Chicksaw Rd., Memphis, Tenn. 38117

[21] Appl. No.: 20,916

[22] Filed: Mar. 14, 1979

Related U.S. Application Data

[63] Continuation-in-part of Ser. No. 767,060, Feb. 7, 1977.

[51] Int. Cl.³ .............................................. F02B 33/00
[52] U.S. Cl. .................................. 123/568; 123/1 A; 123/571; 123/344; 74/645
[58] Field of Search ............... 123/32 ST, 1, 568, 571, 123/344; 60/906, 423, 431, 278, 279; 74/645, 859; 416/25 T; 180/65 C, 66 R

[56] References Cited

U.S. PATENT DOCUMENTS

| | | | |
|---|---|---|---|
| 3,369,360 | 2/1968 | DeBiasi | 60/396 |
| 4,005,577 | 2/1977 | Haumaier | 60/431 |
| 4,005,689 | 2/1977 | Barnard | 123/119 A |
| 4,014,302 | 3/1977 | Houston | 123/119 A |
| 4,023,641 | 5/1977 | Ganoung | 180/66 R |
| 4,043,305 | 8/1977 | Henault | 123/119 A |

OTHER PUBLICATIONS

"Evaluation of E.G.R.," Glass et al., SAE Publication 700146, 1/12–16/70.
"Stepless Transmission," Lindsley, Popular Science Magazine, 12/76.

*Primary Examiner*—Ronald B. Cox

[57] ABSTRACT

An automotive powertrain includes a conventional piston engine, a continuously variable ratio transmission, an engine speed sensor and a feedback control system. The control system adjusts both the transmission ratio and the throttle valve in the engine carburetor or fuel metering system in response to the position of the accelerator pedal and in response to the crankshaft speed as measured by the engine sensor. The transmission provides extreme overdrive gear ratios which allow the engine to be operated at wide open throttle even during moderate cruising, and, in addition, the engine carburetor or fuel metering system is calibrated to deliver to the engine a stoichiometric air-fuel mixture which is combined, before combustion, with a special proportion of recirculated exhaust gas. As a result of extensive wide open throttle engine operation with the above mentioned intake charge composition, combustion variables are optimized to produce exceptional fuel economy.

23 Claims, 3 Drawing Figures

POWERTRAIN AND APPARATUS USING A CONTINUOUSLY VARIABLE RATIO TRANSMISSION TO IMPROVE FUEL ECONOMY

CROSS REFERENCE TO RELATED APPLICATIONS

This application is a continuation-in-part of my co-pending application Ser. No. 767,060, filed Feb. 7, 1977 now pending and entitled "Powertrain and Apparatus Using a Continuously Variable Ratio Transmission to Achieve High Fuel Economy Operation of a Combustion Engine with Acceptable Exhaust Emissions." The above mentioned application Ser. No. 767,060 is in turn a continuation-in-part of my application now issued as U.S. Pat. No. 4,023,641.

BACKGROUND OF THE INVENTION

1. Field of the Invention

This invention relates to internal combustion engines, and more particularly, to the fuel economy of internal combustion engines.

2. Description of the Prior Art

The recent emphasis on energy conservation has spawned interest in automotive transmissions. The prior art does recognize that an automotive transmission can influence engine efficiency, and that this influence may be more important than the efficiency of the transmission itself. This is especially true in the case of a continuously variable ratio transmission, and the idea of using such a transmission to improve the operating efficiency of an associated engine is not new.

As an illustration, a given power level, say 30 h.p., can usually be produced throughout a broad range of crankshaft speed by adjusting the engine throttle to appropriately regulate the torque developed. However, peak efficiency for any particular power level will usually occur at only one distinct crankshaft speed. So if a fixed power level, 30 h.p. in this example, is required for 55 m.p.h. cruising, or for climbing a hill at 30 m.p.h., or for any of the infintely many speeds in between, then a continuous range of gear ratios must be available to permit the 30 h.p. to always be produced at the single most efficient crankshaft speed. This principle has been recognized.

What has not been recognized is that the design and calibration of the conventional automotive engine in large measure precludes really efficient operation. So while the prior art includes using a continuously variable ratio transmission to optimize the operation of the conventional automotive engine design, the inefficiency inherent in this design greatly limits the results. The rich calibration of the conventional carburetor at w.o.t. (wide open throttle) best exemplifies this contradiction.

Using a conventional transmission, w.o.t. engine operation is not normally available for cruising, but rather is usually used only when maximum vehicle speed or acceleration is needed. Since a rich air-fuel ratio at w.o.t. does provide maximum engine torque, and thus maximum power at any particular crankshaft speed, the conventional carburetor calibration is in fact entirely appropriate when used in conjunction with a conventional automotive transmission. On the other hand, w.o.t. can be consistently available for even moderate cruising if a continuously variable ratio transmission is used. Since the extra power of a rich air-fuel ratio is gained at the expense of efficiency and is not needed for cruising, conventional carburetor calibration is entirely inappropriate for a continuously variable ratio transmission powertrain oriented toward fuel economy. Nevertheless, the great majority of prior art research and development work with the continuously variable ratio transmission automotive powertrain includes the use of w.o.t. air-fuel ratio enrichment, and this is but one example of the way in which the prior art has failed to consider the interrelationships of powertrain components. In the prior art related to continuously variable ratio transmission powertrains, emphasis has been on the transmission, but the engine is of at least equal importance. Fuel economy increases of about 25% are typical of the prior art.

In conclusion, the relatively high efficiency of the Otto thermodynamic cycle has been acknowledged. However, the idea that combustion variables can be optimized in the conventional Otto cycle automotive engine, and that a continuously variable ratio transmission is but one of the requirements for this optimization, is not within the prior art.

SUMMARY OF THE INVENTION

In light of the above, it is therefore a principal object of the invention to present apparatus for optimizing combustion in the spark ignition Otto cycle engine.

It is also an object of the invention to present a powertrain for significantly improving the fuel economy of conventional automobiles.

It is further an object of the invention to present an automotive powertrain which allows wide open throttle engine operation over a wide range of driving conditions, including moderate steady-state cruising on level ground.

It is yet another object of the invention to present an automotive powertrain which emits acceptable levels of nitrogen oxides emissions.

These, and other objects, features, and advantages, will become apparent to those skilled in the art from the following detailed description when read in conjunction with the appended claims and the accompanying drawing.

In accordance with the invention in its broad aspect, apparatus for optimizing combustion in an Otto cycle engine is presented. The apparatus includes a continuously variable ratio transmission, a device for operator control and a specially calibrated engine fuel metering system which incorporates exhaust gas recirculation. Toward the goal of maximizing efficiency, the operator control device facilitates wide open throttle engine operation throughout a wide power range of the engine. To further increase efficiency, and also to reduce nitrogen oxides exhaust emissions, the fuel metering system provides at wide open throttle a stoichiometric air-fuel mixture intermixed with recirculated exhaust gas in a proportion between that which minimizes the brake specific fuel consumption of the engine and that which produces incipient combustion miss.

BRIEF DESCRIPTION OF THE DRAWING

The invention is illustrated in the accompanying drawing, in which.

In the figures of the drawing, like reference numerals are used to denote like parts.

DESCRIPTION OF THE PREFERRED EMBODIMENT

Figure 1:
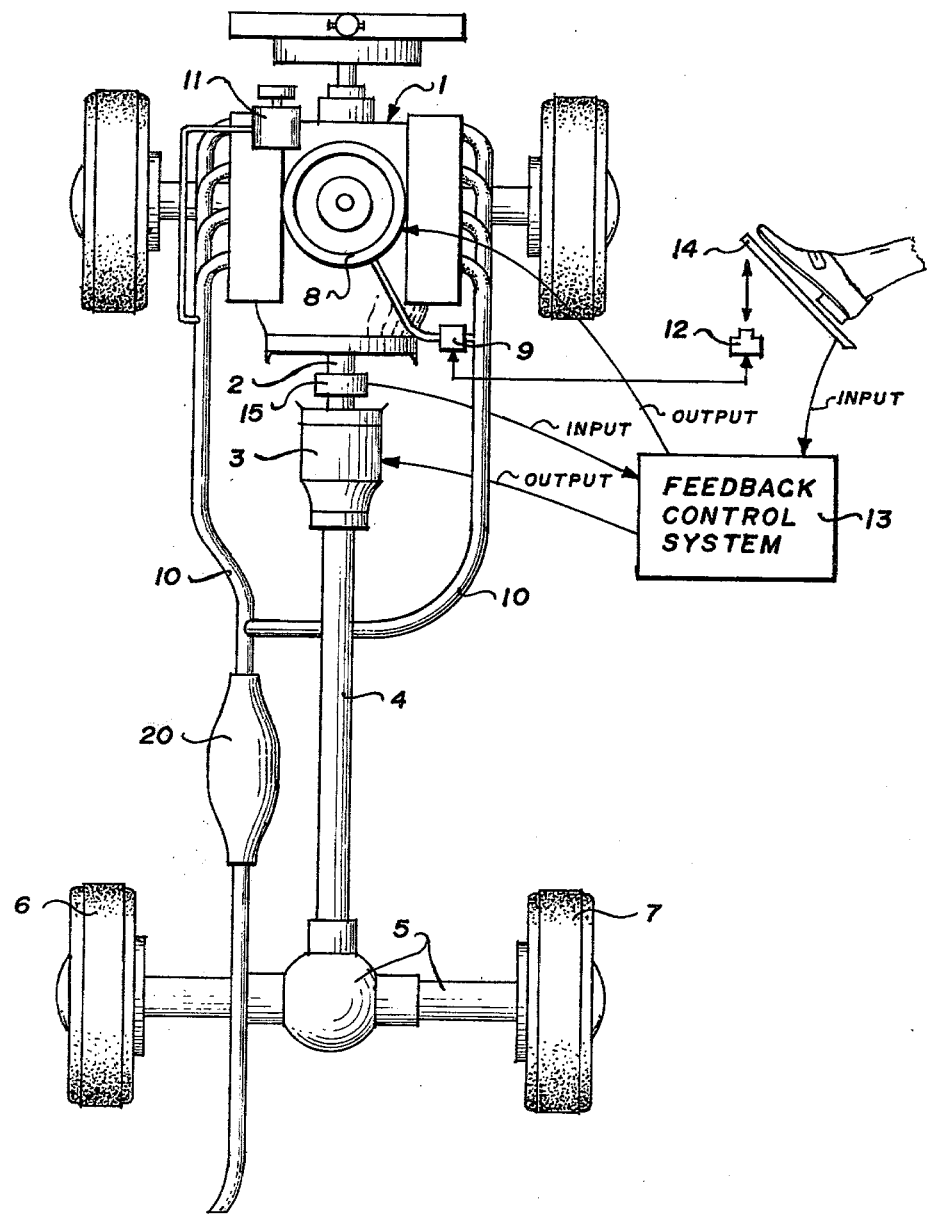
FIG. 1 is a diagram of an automotive powertrain in accordance with a preferred embodiment of the invention.

FIG. 1 shows how a preferred embodiment of an automotive powertrain would be constructed in accordance with the present invention. In FIG. 1, the crankshaft of a basically conventional homogeneous charge piston engine 1 directly drives the input shaft 2 of a continuously variable ratio transmission 3. The transmission 3 may be any of the type having a wide range of ratios, about 6 to 1 or even significantly greater, and having reasonably high efficiency throughout its operating range of ratios and of input and output torques. The output shaft of the transmission 3 drives the propeller shaft 4 of the powertrain through a universal joint (now shown), and the propeller shaft 4 in turn drives the input of a conventional geared differential and drive axle assembly 5 through another universal joint (not shown). Finally, the differential assembly 5 drives the rear tires 6 and 7 which propel an associated automobile.

The gear ratio of the differential 5, in conjunction with the diameter of the tires 6 and 7 and the lower numerical gear ratios of the transmission 3, is such that essentially the maximum operating torque capability of the engine 1 can be absorbed just in maintaining normal level road cruising of the automobile. The middle and higher numerical ratios of the transmission 3 can then provide extra driving torque to the tires 6 and 7 for vehicle acceleration, hillclimbing and the like.

Also part of the preferred embodiment is the feedback control system, generally indicated by the block 13. This control system 13 has an input controllable by the vehicle operator through a pedal 14 and another input from a device 15 which senses the crankshaft speed of the engine 1. The control system 13 additionally has outputs to control the ratio of the transmission 3 and to control the engine throttle valve, which is interposed in the flow of intake charge admitted to the cylinders of the engine 1 for combustion. The throttle valve is located in the fuel metering system 8 of the engine 1.

With the exception of the geared differential 5, the preferred embodiment so far described herein is nearly identical to that disclosed in my U.S. Pat. No. 4,023,641, in which differential action is achieved with twin hydraulic drive motors rather than with a conventional geared differential. The preferred embodiment of the present invention, however, includes additional components. First, an EGR (exhaust gas recirculation) valve 9 controls flow of exhaust gas from the engine exhaust system 10 to the fuel metering system 8. Second, the exhaust system 10 delivers the engine exhaust gas to an oxidizing catalytic converter 20, and an engine-driven air pump 11 injects air into the exhaust gas effectively downstream of the EGR pickup, but upstream of the converter 20. Finally, the fuel metering system 8 is calibrated to produce an essentially stoichiometric fuel-air mixture. Also, when the EGR valve 9 is open, the fuel metering system 8 intermixes inert exhaust gas with the stoichiometric air-fuel mixture in a special proportion, to be discussed, and this intermixture is then delivered to the cylinders of the engine 1 for combustion.

In operation, the feedback control system 13 adjusts the ratio of the transmission 3 and the opening of the fuel metering system 8 throttle valve in response to the operator command through depression of the pedal 14 and in response to engine speed as monitored by the sensor 15. This action of the control system 13 is exactly as described for the feedback control system of the preferred embodiment in my U.S. Pat. No. 4,023,641.

In review of the description in U.S. Pat. No. 4,023,641, the engine 1 employs design features, especially of the camshaft and induction system, enabling a broad w.o.t. (wide open throttle, referring to the throttle in the fuel metering system 8) torque curve. In other words, any desired power within the wide and continuous range corresponding to this broad torque curve can be developed by the engine 1 simply if the throttle in the fuel metering system 8 is fully opened and if the ratio of the transmission 3 is adjusted to limit the crankshaft speed of the engine 1 to the appropriate value. The control system 13 is, in fact, constructed to hold the throttle in the engine fuel metering system 8 wide open whenever engine speed is within the broad range where w.o.t. operation is desirable. If the engine 1 is properly designed for extensive w.o.t. operation, this range where w.o.t. operation is desirable will extend from somewhat above idle speed to nearly the crankshaft speed were the engine 1 develops maximum power. The ratio of the maximum power developed in this range to the minimum will then be about 7 to 1 or even greater, allowing, in conjunction with the wide range of ratios of the transmission 3, w.o.t. operation of the engine 1 over the great majority of driving conditions, including road elevation and vehicle speed.

Figure 2:
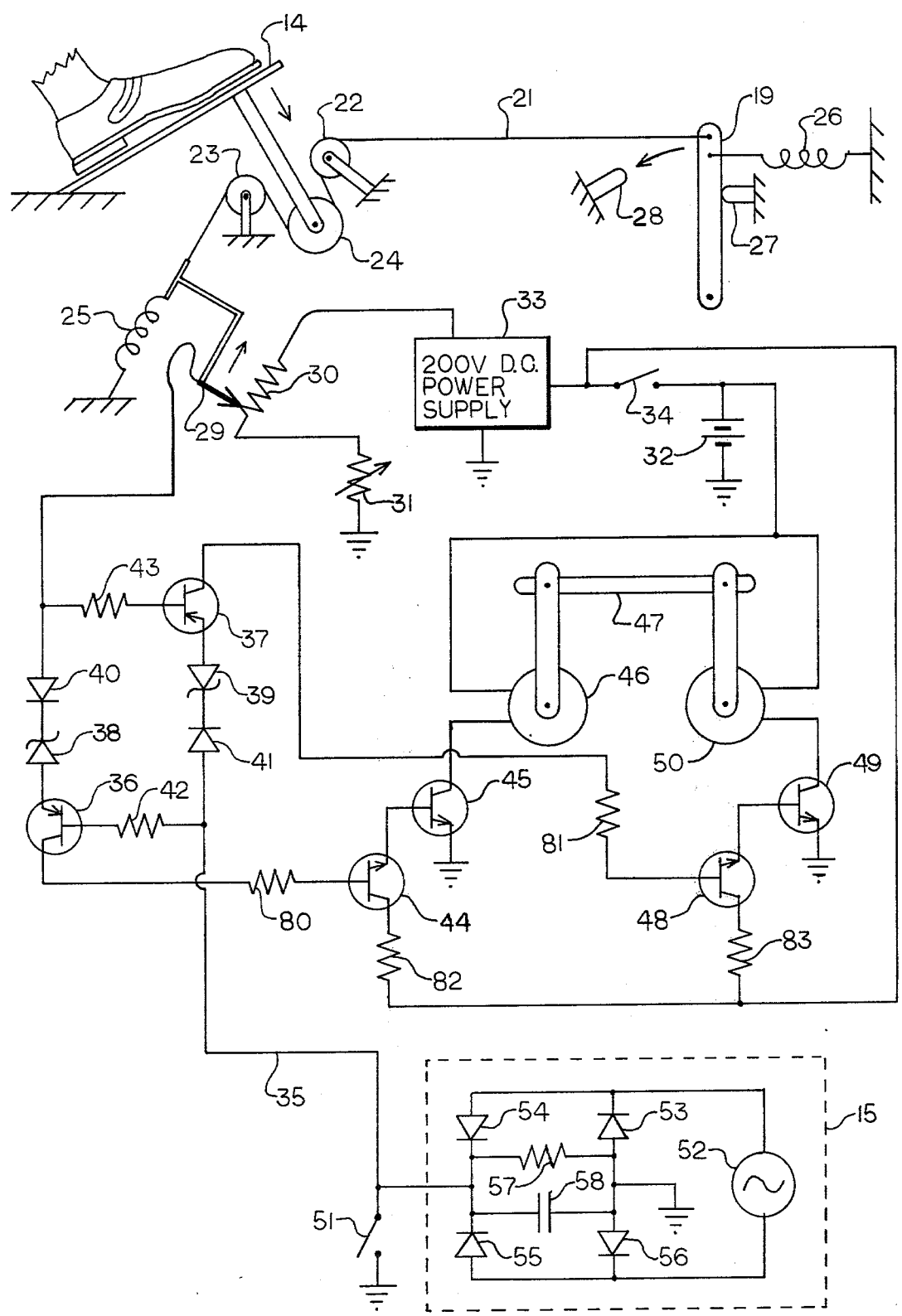
FIG. 2 is an electrical and mechanical schematic diagram of the feedback control system employed in the powertrain of FIG. 1.

FIG. 2 shows one method of construction for the control system 13. First, the accelerator pedal 14 controls the throttle lever 19 through the cable 21. The cable 21 engages the stationarily pivoted pulleys 22 and 23 and also the moveable pulley 24, which is rigidly (but rotatably) attached to the accelerator pedal 14. Depression of the pedal 14 effectively shortens the cable 21 by pushing the portion of it around moveable pulley 24 further through the stationary pulleys 22 and 23. One end of the cable 21 attaches to the throttle lever 19, and the other end to the preloaded tension spring 25. The throttle return spring 26 pulls the throttle lever 19 clockwise toward its idle stop 27 to thereby tension the cable 21. The preload of the spring 25 is greater than the tension induced in the cable 21 by the throttle spring 26 even when the throttle lever 19 is fully counterclockwise against the wide open throttle stop 28. Thus, the initial downward travel of the accelerator pedal 14 will fully open the throttle in the fuel metering system 8 before the preloaded spring 25 is stretched beyond its free length. The depression of the pedal 14 required to fully rotate the throttle lever 19 to the w.o.t. position against the stop 28 is only 20% of the total pedal travel. The remaining 80% of the pedal travel progressively stretches the preloaded spring 25 and thereby moves the attached wiper 29 along the uninsulated turns of the wire wound resistor 30. The variable resistor comprised of this wiper 29 and wire wound resistor 30 has zero resistance relative to its connection to the minimum speed resistor 31 when the preloaded spring 25 is unstretched, and the full resistance of all of its turns when the pedal 14 is fully depressed.

The existing battery 32 of the vehicle electrical system is connected to a 200 volt D.C. power supply 33 through the existing vehicle ignition switch 34. Positive current from the 200 volt potential of the power supply 33 flows first through the wire wound resistor 30, then through the minimum speed resistor 31 and back to the power supply 33 through ground. As a result, the wiper 29 picks up from the wire wound resistor 30 a voltage which is constant for all positions of the pedal 14 that open the throttle of the engine 1 less than fully. Minimum speed resistor 31 determines this voltage and may be varied as a function of desired parameters such as the fast idle speed of the engine 1 during cold operation.

The speed sensor 15 supplies, on conductor 35, a D.C. voltage which is compared to the voltage on wiper 29. Transistors 36 and 37, along with their associated components 38, 39, 40, 41, 42 and 43, accomplish this comparison. With w.o.t. already existing, the wiper 29 picks up a potential that increases with increasing depression of the pedal 14. Correspondingly, the potential developed by the sensor 15 increases with increasing speed of the engine 1. For instance, if the crankshaft speed of the engine 1 is less than that being commanded by the position of the pedal 14, then the potential on the wiper 29 will exceed that supplied on conductor 35 by the speed sensor 15, and transistor 36 will be biased into conduction while transistor 37 will be non-conductive due to a slight reversebias across rectifier 41. Consequently, amplifier transistor 44 will turn power transistor 45 on to conduct current through the servomotor 46, which rotates counterclockwise to increase the numerical ratio of the transmission 3 by moving the ratio control bar 47 for the transmission 3 to the left. The resulting increase in ratio will allow the speed of the engine 1 to increase and thereby eliminate the error in engine speed. If engine speed becomes higher than commanded by the position of the pedal 14, transistors 37, 48 and 49 turn on the clockwise rotating servomotor 50 to thereby decrease both the ratio of the transmission 3 and the crankshaft speed of the engine 1. The finite operating speed of the servomotors 46 and 50 can inherently provide a damping factor in the design of the feedback control system 13, and the Zener diodes 38 and 39 provide a null band that eliminates excessive small changes in ratio of the transmission 3. The connection of the amplifier transistors 44 and 48 to the battery 32 through the ignition switch 34 ensures that the servomotors 46 and 50 will not operate after the ignition switch 34 is turned off.

In summary of the operation of the control system 13, the crankshaft speed of the engine 1 and the position of the engine throttle lever 19 are, just as is the case in a conventional automotive powertrain, the two parameters used to control the motive power developed. Within the first 20% of travel of the pedal 14, the position of the throttle lever 19 is used as the power controlling variable while the speed of the engine 1 is held essentially constant at a value determined by the resistor 31. Since this speed is low, and since a high concentration of recirculated exhaust gas is supplied at w.o.t., as will be explained, the resulting minimum power available from the engine 1 at w.o.t. is only about 10% of the maximum power. In contrast to the first 20% of travel of the pedal 14, the w.o.t. operating range of the engine 1 produces a roughly constant crankshaft torque output with only engine speed being used to regulate power output. In this w.o.t. range, the vehicle operator effectively uses the pedal 14 to select a specific w.o.t. engine speed, and thus a specific power output. Although the method of power control used in a conventional powertrain holds neither engine speed or throttle opening constant throughout a range of power, the response to the pedal 14 is very similar to that experienced in a conventional automobile with an automatic transmission.

The following example illustrates the interaction of the control system 13 with the other powertrain components shown in FIG. 1. First, assume that associated vehicle is cruising at w.o.t. with an established steadystate power level occurring at 1,000 r.p.m. of the engine 1. If the driver suddenly further depresses the pedal 14 to accelerate, the wiper 29 in FIG. 2 will slide upward along resistor 30 to pickup a higher voltage corresponding to a higher crankshaft speed of the engine 1, say 3,000 r.p.m. The resulting error signal thus generated in the control system 13 will cause the transmission 3 to downshift rapidly, just as a conventional automatic transmission may on occasion downshift to provide greater vehicle acceleration. An example of this downshifting process which is initiated in the control system 13 has already been considered, and the much higher power developed at 3,000 r.p.m. will in fact cause the vehicle to accelerate. Immediately after the newly selected engine speed of 3,000 r.p.m. is first reached, the crankshaft speed of the engine 1 will tend to follow the vehicle acceleration and thereby further increase. However, a more moderate rate of upshift (corresponding to the vehicle acceleration rather than to the maximum speed of the upshift servomotor 50 in FIG. 2) will follow the quick downshift (which corresponds to the maximum speed of the downshift servomotor 46) to prevent engine speed significantly in excess of the commanded 3,000 r.p.m. When a new steady-state vehicle speed requiring the higher power developed at 3,000 r.p.m. and w.o.t. is reached, no further change in transmission ratio will occur unless pedal position is again changed or unless changes in vehicle operating conditions, such as hills, are encountered.

The next example illustrates the case where changing vehicle operating conditions, rather than movement of the pedal 14, cause an error signal, or difference between the voltage on the wiper 29 and that generated by the speed sensor 15. If the driver maintains a constant position of the pedal 14 as the associated vehicle enters the bottom of a hill, then the vehicle will slow down. Assuming an equilibrium w.o.t. crankshaft speed of 1,000 r.p.m. and a steady-state vehicle speed of 50 m.p.h. before encountering the hill, the engine 1 will initially follow the vehicle deceleration that begins when the hill is first reached. However, this loss in engine speed will be quite small, usually less than 50 r.p.m., before the null band provided by the Zener diodes 38 and 39 is exceeded and the transmission 3 begins a downshift that just offsets the deceleration in vehicle speed.

In this second example, the w.o.t. power developed at 1,000 r.p.m. of the engine 1 provided a steady-state vehicle speed of 50 m.p.h. on level ground. This same amount of power would generate some lower steady-state speed, say 30 m.p.h., while climbing the hill. The vehicle will in fact closely approach 30 m.p.h. if the hill is quite long and the position of the pedal 14 is not changed. In thus going from level ground cruising at 50 m.p.h. to an equilibrium speed of 30 m.p.h. while climbing the hill, the crankshaft speed of the engine 1 will not change significantly, but the numerical ratio of the transmission 3 will increase in inverse prorportion to the two vehicle speeds, or by 66.7%.

Most drivers manipulate the accelerator pedal to maintain a nearly constant cruising speed whether traveling on level ground or climbing a hill. This situation illustrates the case where both the driving conditions and the operator input change. Again using the example just given, the higher w.o.t. power developed at, say 1,900 r.p.m., would be required to maintain the original speed of 50 m.p.h. while climbing the hill. Just as in a conventional vehicle, the driver himself acts as a feedback control system and seeks out the new accelerator pedal position that maintains the original speed of 50 m.p.h. In the case of the present invention, that new accelerator position is the one that commands the 1,900 engine r.p.m. required to maintain 50 m.p.h. while climbing the hill. Here, both the numerical ratio of the transmission 3 and the crankshaft speed of the engine 1 increase by 90%.

Returning to FIG. 2, the clutch override switch 51 is optional and may be used in the case when the transmission 3 is not of the type which can reach an infinite numerical ratio and must therefore include an automatic clutch, centrifugal for example. The override switch 51 closes when the automatic clutch is engaging, to thereby ensure full torque multiplication by the transmission 3 at this time. Also to enchance clutch operation, the resistance of the minimum speed resistor 31 may be increased momentarily during engagement.

The engine speed sensor 15 is comprised in FIG. 2 of a small A.C. generator 52, an associated full-wave rectifier (diodes 53, 54, 55 and 56), a load resistor 57 and a filter capacitor 58. Since the rectified output from the generator 52 is applied across load resistor 57, the resulting potential is proportional to the crankshaft speed of the engine 1. The design of the generator 52 and the value of the load resistor 57 are chosen so that this potential is 200 volts when the crankshaft of the engine 1 is turning at the speed where maximum power is developed with no EGR. Consequently, full depression of the pedal 14 commands this crankshaft speed. Filter capacitor 58 reduces ripple in the engine speed signal, and, finally, the turns of the resistor 30 may conveniently be wound on a form having a profile that gives most any desired relationship between travel of the pedal 14 and the w.o.t. power to be developed by the engine 1.

Figure 3:
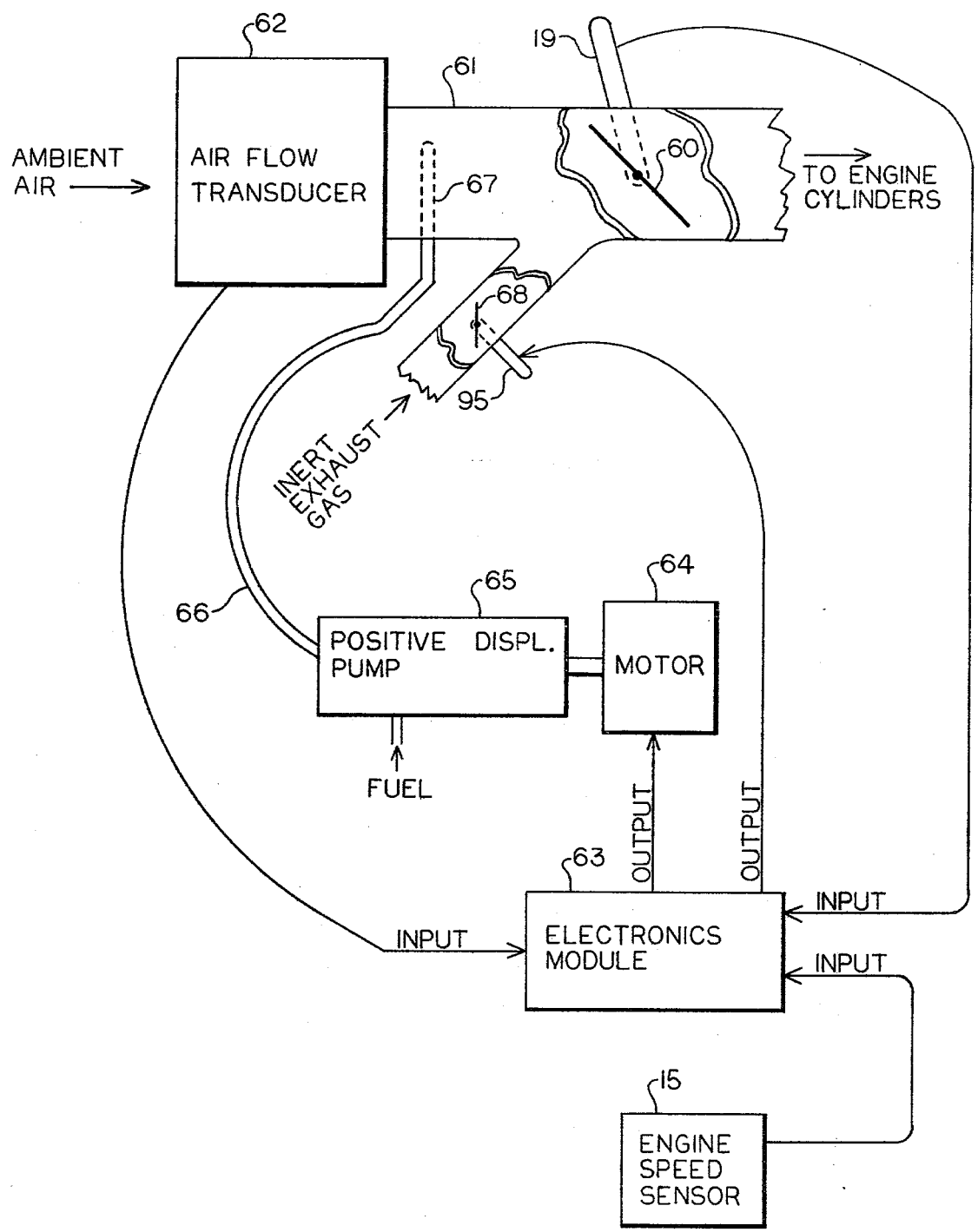
FIG. 3 is a basic diagram of the engine fuel metering system used in the powertrain of FIG. 1.

FIG. 3 shows a basic method of construction for the fuel metering system 8 in FIG. 1. The throttle lever 19 from FIG. 2 rotates the throttle butterfly 60 in the large flow conduit 61, which eventually branches to deliver intake mixture to the individual cylinders of the engine 1. As is typical of modern fuel metering systems, the wide open position of the butterfly 60, determined by the w.o.t. stop 28 in FIG. 2, allows the engine 1 to induct intake mixture at essentially atmospheric pressure throughout its entire crankshaft operating speed range. At the other end of the conduit 61, an air flow transducer 62 generates an electrical signal which is a function of the mass flow rate of ambient air entering the conduit 61. This mass flow signal from the transducer 62 is applied to the electronics module 63, which powers the electric motor 64 at a speed predetermined to cause the positive displacement fuel pump 65 to deliver a fuel flow that is in stoichiometric proportion to the mass air flow rate measured by the transducer 62. Since the pump 65 is in fact directly driven by the motor 64, it does deliver this stoichiometric fuel flow through fuel line 66 to the fuel rail 67, which atomizes the fuel into the conduit 61 upstream of the throttle butterfly 60.

The conduit 61 preferably includes an electrosonic vibrator (not shown) for more thoroughly atomizing the fuel when the butterfly 60 is wide open at low crankshaft speeds of the engine 1.

The fuel metering system electronics module 63 also has an output controlling the position of a butterfly 68 interposed in the EGR flow to the conduit 61. In other words, this butterfly valve 68 and the EGR override valve 9 seen in FIG. 1 are in series, but the valve 9 presents no significant resistance to the EGR flow, except in a special case that will be considered.

The position of the butterfly 68 provides the special proportion of EGR previously mentioned. This proportion is determined through stationary dynamometer testing of an engine identical in design to the naturally-aspirated engine 1. This test engine is evaluated exclusively at w.o.t. and at crankshaft speeds incrementally increasing from slightly above idle to the maximum power r.p.m. At each crankshaft speed to be investigated, the brake specific fuel consumption (b.s.f.c.) of the test engine is measured as the butterfly 68 is incrementally opened. Of course, the air-fuel constituent of the intake charge remains stoichiometric because the flow transducer 62 measures only air flow, unaffected by EGR rate. Brake specific exhaust emissions are also measured, and the test engine must experience the back-pressure of the complete exhaust system to be used in the associated vehicle.

At each investigated speed of the test engine, a single corresponding position of the butterfly 68 will be found to minimize b.s.f.c., and a slightly more open position of the butterfly 68 will cause the test engine to reach a combustion miss threshold where misfiring due to excessive exhaust gas dilution becomes incipient. Between these limits, but usually closer to the minimum b.s.f.c. boundary, the optimum compromise between b.s.f.c. and emissions can be chosen in consideration of the applicable emissions standards and the power consumed in driving the associated vehicle through the various phases of the federal emissions testing procedures. This is done, with mbt spark timing being maintained, for each engine speed investigated, and the net result is an engine-speed schedule of positions of the valve 68. Microprocessors in the module 63 are programmed to apply this schedule to the butterfly 68. The existing speed sensor 15 supplies the required speed input to the module 63, and the throttle lever 19 supplies an override input to the module 63. At other than nearly wide open positions of the throttle butterfly 60, as indicated by the input from the throttle lever 19, the module 63 is programmed to fully close the EGR butterfly 68. An intake manifold actuated EGR override is an alternative to using the input from the throttle lever 19.

A lean-burn combustion chamber design is preferably used in the engine 1 to improve performance under the high EGR conditions just described. The high-turbulence design developed by Swiss engineer Michael May, and Toyota's blind pre-chamber design, are good examples. In addition, the catalytic converter 20 may be built into the exhaust manifold of the engine 1 to offset exhaust gas temperature decrease due to EGR.

Autotronic Controls Corporation of El Paso, Texas has developed fuel metering systems almost identical to that of FIG. 3, and the microprocessor scheduling of the EGR valve 68 is like that recently introduced in some production automobiles for the control of ignition spark timing. In addition, the operation of the feedback control system 13 may be recognized as nearly identical to that of the hydraulic control systems long used for the "constant speed propeller" in aircraft. In fact, if hydraulic control pressure is already available, as it is in some types of continuously variable ratio transmissions, then an adaptation of the constant speed propeller control system might be an attractive alternative to the control system shown in FIG. 2. Many alternatives for the fuel metering system shown in FIG. 3 are also within the prior art. For example, a microprocessor fuel injection system recently developed by Edelbrock Equipment Company of El Segundo, Calif. eliminates the "wet intake manifold problem" without resorting to an ultrasonic vibrator for ultra-fine fuel atomization.

In final consideration of FIG. 1, the very last increment of depression of the pedal 14 activites the switch 12 which closes the EGR valve 9 to thereby fully maximize the power developed by the engine 1. This feature significantly increases engine torque, but at the expense of reduced engine efficiency.

The most important advantages of the preferred embodiment described herein result from extensive w.o.t. engine operation wherein many combustion variables in the Otto cycle engine are optimized. For example, engine frictional losses are approximately independent of the torque delivered by an Otto cycle engine, but increase quite drastically with crankshaft speed. Therefore, high combustion pressures, which produce power at relatively high torque values and relatively low crankshaft speeds, reduce the percentage loss to engine friction. However, the very maximum combustion pressure requires maximum combustion temperature, which increases losses to: (1) the cylinder bores, cylinder heads, and other surfaces directly exposed to the combustion gases as they expand against the moving piston, (2) the molecular structure of the combustion gases due to increased dissociation, and (3) the molecular structure of the combustion gases because of the decreasing ratio of the constant pressure to the constant volume specific heat. The net result is that maximum engine efficiency usually occurs at somewhat less than the maximum obtainable combustion temperature. Nevertheless, the best compromise between high temperature and high pressure represents significantly increased efficiency in comparison to the operating conditions required in a conventional powertrain, especially when the throttle butterfly 60 is wide open as discussed below. Additionally, this compromise is fortunate because the somewhat moderated combustion temperatures it produces help reduce the formation of nitrogen oxides.

In further considering the compromise between high combustion pressure to reduce frictional losses versus lower pressure and temperature to reduce the heat losses enumerated, it is evident that combustion pressure can be increased without necessarily increasing combustion temperature. This is true because combustion pressure depends on the density of the combustion gases as well as on their temperature, and thus the optimum compromise occurring at w.o.t. is superior to that occurring with throttling because the density of the combustion gases is maximized at w.o.t. In addition, w.o.t. operation minimizes pumping losses in the engine induction system.

Throttling (a free expansion) of the gaseous portions of the intake charge, before the fuel is added, is herein also considered to be throttling of the intake charge admitted to the engine for combustion. Throttling is so defined herein for convenience and because the negative effects of pumping losses and reduced density of the combustion gases exist regardless of whether throttling takes place before or after the fuel is added. Also, slight throttling purely for the purpose of contributing to the simplicity or accuracy of the engine fuel metering system is not herein considered to be throttling of the intake charge admitted to the engine for combustion. As an illustration, air valve carburetor throats contain a butterfly-like air valve in addition to the throttle valve proper, and this air valve throttles the intake flow very slightly to create a fuel metering pressure differential, without which the carburetor throat would not meter fuel properly. The purpose of this slight throttling is not to vary engine torque as a method of controlling drive axle torque in response to vehicle operator commands, and therefore, it is not herein considered to be throttling of the intake charge admitted to the engine for combustion. In conventional automotive powertrains, however, the primary function of engine throttling is to control drive axle torque in response to driver commands. In the present invention, drive axle torque is usually controlled by varying the transmission ratio.

An additional consideration is the difference between throttling and restriction of the gaseous portion of the intake charge admitted to the engine for combustion. Since throttling is a free expansion, it necessitates pumping losses. Restriction similarly reduces the density of the intake gases, but pumping losses are not involved. For example, heating of the gaseous portion of the intake charge reduces its density and thus restricts mass flow rate and density of the combustion gases, but it is not throttling because there are no pumping losses. Obviously then, the preferred embodiment of the present invention also has no restriction of the intake charge for the purpose of controlling drive axle torque in respose to operator commands. Moderate restriction to implement the operation of a fuel metering system is not herein considered to be restriction of the intake charge, and the definition of restriction of the intake charge herein applies to the gaseous portion of the charge, before and after the fuel is metered into the gaseous portion.

In effect then, unthrottled flow of the intake charge delivered to an engine for combustion is herein defined to mean that free expansion caused reductions in density of the charge, as finally delivered to the engine with the desired constituents in the desired proportions, are eliminated insofar as is practical using an embodiment according to the present invention. Of course, elimination of reductions of the charge density which limit engine torque as a means of limiting drive axle torque in response to commands from the vehicle operator is indeed practical using an embodiment according to the present invention. The definition of restricted flow is identical except that there is no stipulation of the cause of reductions in density of the intake charge as finally delivered to the engine.

To this point, it has been established that w.o.t. is the optimum throttle position (and that restriction of the intake charge admitted to the engine should be minimized). Furthermore, with w.o.t. having been obtained, the combustion temperature which provides the highest efficiency (lowest brake specific fuel consumption) should then also be obtained. With the throttle wide open, and assuming mbt spark timing, fixed combustion chamber design, fixed crankshaft speed and the like, the combustion temperature depends only on the amount of fuel consumed per combustion cycle. If the EGR valve 9 is closed, the intake charge will be composed of only air with fuel droplets and fuel vapor suspended therein, and the air-fuel ratio will solely determine the amount of fuel consumed per combustion cycle if other variables do not significantly effect the mass of air inducted per combustion cycle. In this case, where the EGR valve 9 is closed, minimum brake specific fuel consumption will occur at a distinctly leaner than stoichiometric air-fuel ratio, usually of about 22 to 1 by weight for a naturally aspirated gasoline engine with a combustion chamber design promoting very high turbulence. Further enleanment would of course reduce efficiency, but might be desirable because nitrogen oxides emissions are further reduced with reduced combustion temperature. Enleanment past the point of incipient lean induced misfire (combustion miss) would not be desirable. So an air-fuel ratio somewhere between that producing the minimum b.s.f.c. (brake specific fuel consumption) and that producing incipient combustion miss is optimum. For a homogeneous charge gasoline engine of good high turbulence combustion chamber design, the w.o.t. lean limit for combustion miss is usually at an air-fuel ratio of about 25 or 26 to 1, and the optimum air-fuel ratio will depend on the most desirable tradeoff between fuel economy and control of nitrogen oxides emissions. This tradeoff in turn depends on variable factors such as vehicle weight and the stringency of legal limits for exhaust emissions. This method of extensive w.o.t. engine operation at the optimum lean burn air-fuel ratio as just described, with the EGR valve 9 always closed, is in essence the subject of my U.S. Pat. No. 4,023,641, but it is also instrumental for fully understanding the present invention. One further point is that the excess air in a lean burn air-fuel charge enhances efficiency and reduces carbon monoxide emissions by insuring complete combustion, and the excess air also inherently provides oxygen for oxidation of hydrocarbon emissions in an exhaust reactor or catalytic converter.

To return to the present invention, the control of nitrogen oxides emissions described above and provided by the preferred embodiment disclosed in my Pat. No. 4,023,641 might not always be sufficient to meet very strict legal requirements, especially for the case of a very heavy automobile. Since the fuel metering system 8 of the present invention provides a stoichiometric air-fuel mixture diluted with inert exhaust gas, instead of with oxygen-containing air, the unavailability of oxygen after combustion provides the needed further reduction in nitrogen oxides emissions. In addition, the essentially stoichiometric air-fuel mixture reduces deterioration in driveability due to slight cycle-to-cycle variations in air-fuel ratio. On the other hand, the catalytic converter 20 and associated air pump 11 then are usually required for acceptable control of hydrocarbon and carbon monoxide emissions, and some efficiency is lost because there is not excess oxygen in the combustion chamber to insure complete combustion.

When inert exhaust gas is used to dilute a stoichiometric air-fuel mixture according to the present invention, the objective is the same as just explained for the invention disclosed in my U.S. Pat. No. 4,023,641, namely, to reduce combustion temperature at w.o.t. to the point where b.s.f.c. is minimized, or slightly beyond that point to further reduce nitrogen oxides emissions. Thus, the boundaries of the optimum dilution are the same (minimum b.s.f.c. and incipient combustion miss), but the actual values of these boundaries depend on the nature of the diluting constituent, which is exhaust gas for the present preferred embodiment and air for the preferred embodiment disclosed in my U.S. Pat. No. 4,023,641.

Even closer control of nitrogen oxides emissions can be achieved with modification of the present preferred embodiment to allow three-way operation of the catalytic converter 20. Although deletion of the air pump 11 is part of the required modification, the total cost is greater because the air-fuel mixture must be held within a very close tolerance of stoichiometric. This is usually done using manifold fuel injection specially controlled by feedback from an oxygen-sensing probe placed in the engine exhaust upstream of the catalytic converter. A catalyst consisting of platinum and about 10% rhodium will function as a three-way catalyst if, and only if, the air-fuel constituent of the intake charge is stoichiometric and the diluting constituent is inert.

Because of wall-quenching and other mechanisms, complete combustion in the engine is impossible. However, a platinum-rhodium catalyst promotes the full completion of the combustion reactions after the exhaust gas leaves the engine. Thus, hydrocarbon and carbon monoxide emitted from the engine can reduce nitrogen oxides in the presence of the catalyst. If the air-fuel mixture is slightly lean, hydrocarbons and carbon monoxide will be oxidized with free oxygen in preference to oxygen from nitrogen oxides. On the other hand, a slightly rich mixture does not allow complete oxidation of hydrocarbons and carbon monoxide. If the preferred embodiment is modified as described to achieve this three-way catalyst operation, then the purpose of dilution with recirculated exhaust gas is only to minimize b.s.f.c., and there is no significant advantage in dilution beyond that point. In fact, less dilution might be desirable. For example, less than ideal combustion chamber design could cause the point of incipient combustion miss to occur with less dilution than that which minimizes b.s.f.c.

In summary, the preferred embodiment of the present invention optimizes the majority of combustion variables in the Otto cycle engine, and, as a result, fuel economy increases approaching 75% are possible. This optimization is of primary importance and it fixes the torque delivered by the engine. Since drive axle torque is the product of engine toruqe and the overall gear ratio, a continuously variable ratio transmission is required to simultaneously allow both the optimization of combustion variables and the continuously variable selection of drive axle torque to which automobile drivers are accustomed. An automobile could, however, operate without a continuous range of drive axle torque. In this sense, the transmission is a secondary consideration.

The research literature does include some dynamometer data related to the present invention. For example, studies which map b.s.f.c. (at mbt spark timing for each dynamometer test point) against air-fuel ratio for various fixed throttle settings or fixed values of brake torque do show maximum efficiency to occur at w.o.t. and an air-fuel ratio distinctly leaner than stoichiometric. This type of data is relevant to the preferred embodiment that has been described because dilution of the air-fuel mixture with recirculated exhaust gas produces results very similar to that obtained with dilution by the excess air of lean combustion. Although the data points are usually obtained at a fixed crankshaft speed, the theory of optimized combustion just developed predicts that the b.s.f.c. improvement occurring at w.o.t. and optimum air-fuel dilution rate should be roughly independent of crankshaft speed. Thus, even though a dynamometer data point obtained at, say, 3,000 r.p.m. and a w.o.t. b.m.e.p. (brake mean effective pressure) of 90 psi represents twice the power output of a throttled data point at the same r.p.m. and a b.m.e.p. of 45 psi, the b.s.f.c. values of such points may be compared directly in predicting the fuel economy improvement offered by the present invention. (For a driving condition where the present invention would allow b.m.e.p. to be doubled in comparison to a conventional powertrain, crankshaft speed would have to be divided by a factor of about 2.)

If this method of prediction is used, the results will vary widely from one research study to another, some studies predicting quite spectacular fuel economy gains and others being much less optimistic. This discrepancy is most likely due to design contrasts between the engines investigated rather than to errors in the different studies.

As an example of the way in which engine design might significantly affect the data upon which CVT (continuously variable transmission) powertrain predictions are based, researchers often find a maximum cylinder-to-cylinder variation in air-fuel ratio of nearly 5 units in four-cylinder carbureted engines operated at w.o.t., but only about 2 units variation at part-throttle for the same engine. This illustrates the usual case where a design variable is more nearly optimized for part-throttle efficiency than for w.o.t. efficiency, whether intentional or not. On the other hand, it is easy to imagine that if this bias were reversed, w.o.t. efficiency would improve while part-throttle efficiency would deteriorate. Thus, engines having a preponderance of design variables biased toward part-throttle efficiency will show modest improvements in b.s.f.c. for w.o.t., lean-burn operation, while a preponderance of design variables in favor of w.o.t. efficiency will produce much more spectacular results.

Of significant importance is a part of the design philosophy that should be included in the preferred embodiment: engine design variables should not be merely biased toward w.o.t. operation, but should be selected almost in sole consideration of w.o.t. operation. Furthermore, little or no relevant data has been obtained with the previously recommended lean-burn combustion chamber designs which increase efficiency by counteracting the reduced flame propagation rate in lean and otherwise diluted air-fuel mixtures. The net result is that predictions of the fuel economy gains offered by the present invention can be based on existing research data, but these predictions will usually be conservative to the point of total inaccuracy.

Although the invention has been described and illustrated with a certain degree of particularity, it should be understood that the present disclosure is made by way of example only and that numerous changes in the arrangement and combination of parts may be resorted to without departing from the spirit and scope of the invention as hereinafter claimed. As a brief illustration of this, a variable pitch aircraft propeller can function as a continuously variable ratio transmission, and the Wankel rotary engine is an Otto cycle engine.

What is claimed is:

1. Apparatus for improving the operating efficiency of a homogeneous charge, spark ignition internal combustion engine, comprising:

a continuously variable ratio transmission having a relatively wide range of ratios, having a power input shaft coupled to a power output shaft of the engine and having a power output shaft, operator control means for providing an unthrottled flow of intake charge to the engine for combustion and for concurrently providing ratio selection throughout a sufficiently wide operating ratio range of said transmission to facilitate regulation of the torque delivered to a load by said transmission output shaft to a desired value which varies widely while the speed of said transmission output shaft remains constant, and fuel metering means for controlling the composition of said unthrottled flow of intake charge admitted to the engine for combustion, said fuel metering means providing as a first constituent of said intake charge a substantially stoichiometric air-fuel mixture and providing a second diluting constituent of said intake charge comprising recirculated exhaust gas and being in a proportion to said first constituent inclusively between that proportion which substantially minimizes the brake specific fuel comsumption of the engine and that proportion which produces incipient combustion miss of the engine, said two inclusive boundary proportions being defined for existing operating conditions of the engine including the existing speed of said engine power output shaft, the existing density of said stoichiometric air-fuel mixture and the existing composition of said second intake charge constituent.

2. The apparatus of claim 1 further comprising drive axle means for applying the power associated with said torque delivered by said transmission output shaft to the drive wheels of a vehicle powered by the engine, the torque multiplication ratio of said drive axle means allowing the torque output of the engine to be fully absorbed just in maintaining steady-state cruising conditions of said vehicle, said engine torque output being that resulting from said unthrottled flow of intake charge.

3. The apparatus of claim 1 wherein said second constituent of said intake charge provided by said fuel metering means is recirculated exhaust gas.

4. The apparatus of claim 1 further comprising means for reducing said proportion of said second intake charge constituent to said first constituent when the speed of said engine power output shaft is substantially that at which the engine develops maximum power.

5. The apparatus of claim 1 further comprising means for eliminating said second intake charge constituent when the speed of said engine power output shaft is substantially that at which the engine develops maximum power.

6. The apparatus of claim 1 wherein said unthrottled flow of intake charge is unrestricted.

7. The apparatus of claim 1 wherein the density of said stoichiometric constituent of said intake charge remains, as delivered to the engine for combustion, substantially constant throughout the unthrottled speed operating range of the engine.

8. The apparatus of claim 1 wherein the engine is a naturally-aspirated engine.

9. The apparatus of claim 1 further comprising a catalytic converter connected to receive the exhaust gases from the engine.

10. The apparatus of claim 1 wherein the design of the engine is biased toward wide-open throttle efficiency at the expense of part-throttle efficiency.

11. The apparatus of claim 1 wherein the engine employs a combustion chamber designed to counteract the reduced flamed propagation rate of lean or otherwise diluted air-fuel mixtures.

12. Apparatus for improving the operating efficiency with which power is delivered to a load by a spark-ignition Otto engine controlled by a throttle, said apparatus comprising:
a continuously variable ratio transmission which transfers power from the engine to the load,
and control system means for implementing unthrottled operation of the engine, said control system means comprising (1) input means for selecting the desired operating speed of the engine, (2) ratio control means operative to adjust the ratio of said transmission to substantially eliminate the difference between said desired operating speed and the actual operating speed of the engine and (3) throttle control means operative to open the throttle to an effectively wide open position when the operating speed of the engine both exceeds a minimum value and is substantially equal to said desired engine operating speed, said minimum engine speed and the engine speed at which the engine develops maximum power bounding the majority of the engine speed range wherein the engine is used to deliver power to the load through said transmission, whereby the high efficiency of unthrottled engine operation is obtained whenever practical engine speeds and available transmission ratios permit.

13. The apparatus of claim 12 wherein (1) said input means provides an engine speed command signal, (2) said ratio control means includes means for providing a measured engine speed signal dependent upon the actual operating speed of the engine and (3) said ratio control means is operative to adjust the ratio of said transmission to substantially equalize said measured engine speed signal and said engine speed command signal.

14. The apparatus of claim 12 wherein said throttle control means is further operative to open the throttle to an effectively wide open position when both the operating speed of the engine exceeds said minimum value and said transmission provides a steady-state torque multiplication greater than its minimum available multiplication of torque delivered from the engine to the load.

15. The apparatus of claim 12 further comprising fuel metering means for automatically providing significant dilution of the air-fuel charge supplied to the engine when the throttle is effectively wide open and the engine is operating between said minimum engine speed and said maximum power engine speed, whereby the inherent high efficiency of unthrottled engine operation is enhanced.

16. The apparatus of claim 15 wherein the engine is a naturally-aspirated, homogeneous charge engine.

17. The apparatus of claim 16 wherein said wide open throttle dilution of said air-fuel charge is in a proportion between that which substantially minimizes the brake specific fuel consumption of the engine and that which causes incipient combustion miss in the engine, said dilution proportions being defined for the existing operating conditions of the engine, including engine speed, the composition of the dilutant and spark timing.

18. The apparatus of claim 15 further comprising means for eliminating said dilution of said air-fuel charge when said input means provides an engine speed command signal corresponding to said maximum power engine speed, whereby the engine operator may select maximum power in preference to optimum efficiency.

19. The apparatus of claim 15 wherein the engine powers a wheeled vehicle and wherein said transmission has a range of ratio which limits the operating speed of the engine to significantly less than said maximum power engine speed when said vehicle is travelling at the maximum speed obtainable on level ground with zero wind velocity and with said dilution of said air-fuel charge, whereby the availability of unthrottled engine operation is extended to level-ground vehicle cruising speeds substantially less than said level-ground maximum.

20. The apparatus of claim 19 wherein the engine is a naturally-aspirated, homogeneous charge engine and wherein said wide open throttle dilution of said air-fuel charge is in a proportion between that which minimizes the brake specific fuel consumption of the engine and that which causes incipient combustion miss in the engine, said dilution proportions being defined for the existing operating conditions of the engine, including engine speed, the composition of the dilutant and spark timing.

21. The apparatus of claim 20 wherein the engine includes a combustion chamber configuration specially intended for operation with lean or otherwise significantly diluted air-fuel mixtures.

22. The apparatus of claim 20 wherein (1) said input means provides an engine speed command signal, (2) said ratio control means includes means for providing a measured engine speed signal dependent upon the actual operating speed of the engine and (3) said ratio control means is operative to adjust the ratio of said transmission to substantially equalize said measured engine speed signal and said engine speed command signal.

23. The apparatus of claim 13 wherein said throttle control means opens the throttle to an effectively wide open position whenever said engine speed command equal or exceeds the valve of said measured engine speed signal that accompanies said minimum engine speed.

* * * * *

UNITED STATES PATENT AND TRADEMARK OFFICE
CERTIFICATE OF CORRECTION

PATENT NO. : 4,280,469
DATED : July 28, 1981
INVENTOR(S) : David P. Ganoung

It is certified that error appears in the above—identified patent and that said Letters Patent is hereby corrected as shown below:

The term of this patent subsequent to May 17, 1994, has been disclaimed.

Signed and Sealed this

Twenty-ninth Day of September 1981

[SEAL]

Attest:

GERALD J. MOSSINGHOFF

Attesting Officer   Commissioner of Patents and Trademarks